(12) United States Patent
Lenkeit et al.

(10) Patent No.: US 8,763,617 B2
(45) Date of Patent: Jul. 1, 2014

(54) MATERIAL REMOVAL SYSTEMS AND METHODS UTILIZING FOAM

(75) Inventors: Holger Lenkeit, Neuenkirchen (DE); Roger Peters, Athus (BE); Pierre Mersch, Bissen (LU); Eric Jankowski, Doncourt les Conflans (FR); Jean Luc Paoletti, Fameck (FR)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 249 days.

(21) Appl. No.: 12/713,283

(22) Filed: Feb. 26, 2010

(65) Prior Publication Data

US 2011/0023911 A1 Feb. 3, 2011

Related U.S. Application Data

(60) Provisional application No. 61/220,054, filed on Jun. 24, 2009, provisional application No. 61/294,639, filed on Jan. 13, 2010.

(51) Int. Cl.
*B08B 7/00* (2006.01)
*B08B 7/04* (2006.01)
*B08B 5/04* (2006.01)

(52) U.S. Cl.
USPC .......... 134/104.2; 83/168; 451/450; 451/451; 451/456; 134/21

(58) Field of Classification Search
USPC .......... 83/168; 451/450, 451, 456; 134/104.2, 134/21
See application file for complete search history.

(56) References Cited

U.S. PATENT DOCUMENTS

| | | | | |
|---|---|---|---|---|
| 2,578,040 A | | 12/1951 | Booth et al. | |
| 3,463,231 A | * | 8/1969 | Hutchison et al. | 166/303 |
| 3,501,414 A | * | 3/1970 | Mueller | 96/177 |
| 3,518,917 A | | 7/1970 | Sluham | |
| 3,589,468 A | * | 6/1971 | Rowand Jr. | 181/296 |
| 3,693,325 A | * | 9/1972 | Muller | 96/177 |
| 4,120,816 A | * | 10/1978 | de Lautrec et al. | 96/156 |
| 4,139,350 A | * | 2/1979 | Sotirianos | 95/242 |
| 4,224,380 A | | 9/1980 | Bovenkerk et al. | |
| 4,325,663 A | | 4/1982 | Lee | |
| 4,358,091 A | | 11/1982 | Talanda | |

(Continued)

FOREIGN PATENT DOCUMENTS

| | | |
|---|---|---|
| CN | 1900522 A | 1/2007 |
| DE | 102004058827 A1 | 6/2006 |

(Continued)

OTHER PUBLICATIONS

European Search Reported dated Mar. 27, 2013 from F-06278-EP, 12 pgs.

(Continued)

*Primary Examiner* — Alexander Markoff
(74) *Attorney, Agent, or Firm* — Joseph P. Sullivan; Abel Law Group, LLP

(57) ABSTRACT

A system and method for removing material (e.g., drilling or cutting) utilizing foam is provided. The system and method may comprise a vacuum collar that removes foam and residual particles from a cutting interface. The foam may be directed to a foam-to-liquid transforming device that decreases the volume of foam.

11 Claims, 12 Drawing Sheets

(56) References Cited

U.S. PATENT DOCUMENTS

| | | | |
|---|---|---|---|
| 4,449,594 A * | 5/1984 | Sparks | 175/59 |
| 4,662,802 A | 5/1987 | Osterman | |
| 5,082,070 A | 1/1992 | Obermeier et al. | |
| 5,127,197 A | 7/1992 | Brukvoort et al. | |
| 5,128,178 A | 7/1992 | Roe | |
| 5,143,525 A * | 9/1992 | Sotirianos | 95/242 |
| D342,270 S | 12/1993 | Kwang | |
| 5,385,591 A | 1/1995 | Ramanath et al. | |
| 5,505,750 A | 4/1996 | Andrews | |
| 5,518,443 A | 5/1996 | Fisher | |
| 5,603,655 A | 2/1997 | Kaneko et al. | |
| 5,660,240 A | 8/1997 | Harms et al. | |
| 5,800,104 A | 9/1998 | Miyano | |
| 5,865,571 A | 2/1999 | Tankala et al. | |
| 5,868,125 A | 2/1999 | Maoujoud | |
| 6,026,618 A | 2/2000 | Locke et al. | |
| 6,033,295 A | 3/2000 | Fisher et al. | |
| 6,039,641 A | 3/2000 | Sung | |
| 6,071,047 A | 6/2000 | Nakai | |
| 6,193,770 B1 | 2/2001 | Sung | |
| 6,286,498 B1 | 9/2001 | Sung | |
| D458,948 S | 6/2002 | Chianese et al. | |
| D459,375 S | 6/2002 | Chianese et al. | |
| D459,376 S | 6/2002 | Chianese et al. | |
| D459,740 S | 7/2002 | Chianese et al. | |
| 6,458,471 B2 | 10/2002 | Lovato et al. | |
| 6,482,244 B2 | 11/2002 | Tselesin | |
| 6,588,516 B2 | 7/2003 | Runquist et al. | |
| 6,609,668 B1 | 8/2003 | Rhodd | |
| 6,673,752 B2 | 1/2004 | Bookbinder et al. | |
| 6,790,245 B2 | 9/2004 | Wolff et al. | |
| 6,792,735 B2 | 9/2004 | Mohlenhoff | |
| 6,817,936 B1 | 11/2004 | Skeem et al. | |
| 6,827,072 B2 | 12/2004 | Schwammle | |
| 6,872,133 B2 | 3/2005 | Lee et al. | |
| 6,878,051 B2 | 4/2005 | Brach | |
| 6,890,131 B2 | 5/2005 | Alvarez-Vega | |
| 6,935,940 B2 | 8/2005 | Skeem et al. | |
| 7,210,474 B2 | 5/2007 | Gaida et a | |
| 7,444,914 B2 | 11/2008 | Brach | |
| 7,879,129 B2 | 2/2011 | Kosters et al. | |
| 7,946,907 B2 | 5/2011 | Heyen | |
| 8,113,097 B2 | 2/2012 | Marx et al. | |
| 2002/0115390 A1 | 8/2002 | Kondo et al. | |
| 2003/0167728 A1 * | 9/2003 | Mohlenhoff | 52/742.16 |
| 2003/0170082 A1 | 9/2003 | Garcia et al. | |
| 2004/0191011 A1 | 9/2004 | Kamphuis et al. | |
| 2005/0279533 A1 | 12/2005 | Corica | |
| 2006/0185492 A1 | 8/2006 | Chianese | |
| 2008/0153402 A1 | 6/2008 | Arcona et al. | |
| 2009/0019981 A1 | 1/2009 | Marx et al. | |
| 2009/0199692 A1 | 8/2009 | Heyen | |
| 2009/0199693 A1 | 8/2009 | Heyen | |
| 2010/0035530 A1 | 2/2010 | Gosamo et al. | |
| 2010/0200304 A1 | 8/2010 | Gosamo et al. | |
| 2010/0248600 A1 | 9/2010 | Chianese et al. | |
| 2010/0279138 A1 | 11/2010 | Zheng | |
| 2011/0023911 A1 | 2/2011 | Lenkeit et al. | |

FOREIGN PATENT DOCUMENTS

| | | |
|---|---|---|
| EP | 0539055 A1 | 4/1993 |
| EP | 0881033 A1 | 12/1998 |
| EP | 0871562 B1 | 1/2003 |
| FR | 2921571 A1 | 4/2009 |
| GB | 2086822 | 5/1982 |
| GB | 2086823 A | 5/1982 |
| GB | 2086824 | 5/1982 |
| GB | 2240262 A | 7/1991 |
| JP | 51-121880 | 10/1976 |
| JP | 01-180341 | 7/1989 |
| JP | 2001293636 A | 10/2001 |
| JP | 2003236730 A | 8/2003 |
| JP | 2003265903 A | 9/2003 |
| JP | 2008254075 A | 10/2008 |
| KR | 10-1999-0082576 | 11/1999 |
| KR | 10-0263787 | 5/2000 |
| RU | 2024730 C1 | 12/1994 |
| RU | 26468 U1 | 12/2002 |
| RU | 2349430 C2 | 3/2009 |
| WO | WO 98/00227 | 1/1998 |
| WO | WO 9907506 A1 * | 2/1999 |
| WO | 2008043625 A1 | 4/2008 |
| WO | 2010/016959 | 2/2010 |
| WO | 2010/118440 | 10/2010 |
| WO | 2011/029106 | 3/2011 |

OTHER PUBLICATIONS

Ishlinsky, A. Yu, Polytechnical Dictionary, Publisher "Sovetskaya Encyclopediya", 1980, p. 601.
International Search Report PCT/US2010/025716 dated Oct. 13, 2010 (3 pgs.).
Norton, Saint-Gobain, "4X4 Explorer" Banner, 1 page.
Norton, Saint-Gobain, "New and Innovative Product Features", 4X4 Explorer, 2 pages.
Norton, Saint-Gobain Abrasives, "The Refractory Materials Specialist", Clipper, 20 pages.
Norton, Saint-Gobain Abrasives GmbH "The Brick Grinding Specialist" Nimbus Diamond Products, 8.
Norton, Saint-Gobain "Step 3—Floor Preparation with CG435" Diamond Grinding Tools, 1 page.
Norton, Saint-Gobain, "Wet Drilling Core Bits—The Revolution O-Tip", Clipper, 2 pages.
Norton, Saint-Gobain, "Wet Drilling Core Bits—Concrete and Concrete Products, O-Tip", Clipper, 2 pages.
Norton, Saint-Gobain Abrasives, "The Core-Driling Specialist", Clipper, 40 pages.
Norton, Saint-Gobain Abrasives S.A. "O-Tip, The Revolution", 4 pages.
Norton, Saint-Gobain Abrasives S.A. "O-Tip—The Corebit Retipping Solution" 2 pages.
Norton, Saint-Gobain Abrasives, "Norton Drilling Inovations" Clipper, 2 pages.
Norton, "Silencio" Clipper, 2009, pp. 26-27.
Norton, "Silencio" Clipper, 2010, pp. 28-29.
Norton, Saint-Gobain, "Silencio" Clipper, 2011, pp. 28-29.
Norton, Saint-Gobain, "Silencio" Clipper, 2012, pp. 24-25.
Norton, Saint-Gobain Abrasives, "Technical and Sales Argumentation" 2008, 12 pages.
Norton, Saint-Gobain Abrasives S.A., "Silencio" EN13236, 2011, 2 pages.
Norton, Saint-Gobain Abrasives, "Silencio—Product Sheet", 2009, 1 page.
Norton, "Wet Drilling Core Bits—Concrete and Concrete Products", 1 page.
Norton, Saint-Gobain Abrasives, S.A., "TWICs—High Performance Diamond Core Drills with New Retipping Technology" 2 pages.

* cited by examiner

MATERIAL REMOVAL SYSTEMS AND METHODS UTILIZING FOAM

CROSS REFERENCE TO RELATED APPLICATIONS

This application claims benefit under 35 U.S.C. §119(e) to U.S. Provisional Patent Application Ser. No. 61/220,054, entitled "Material Removal Systems and Methods Utilizing Foam", filed Jun. 24, 2009 and U.S. Provisional Patent Application No. 61/294,639, filed Jan. 13, 2010, entitled "Material Removal Systems and Methods Utilizing Foam", the contents of both which are incorporated herein in their entirety for all purposes.

FIELD OF THE INVENTION

Embodiments of the present invention relate to systems and methods for removing material (e.g., drilling, cutting, or grinding) utilizing foam. Specific embodiments relate to systems and methods used to recycle the foam.

BACKGROUND

Material removal systems often incorporate cutting element machines (including, for example, saws and drills) that utilize some form of lubrication to assist in cooling the cutting elements and the workpiece (i.e. the object from which material is being removed). Lubrication can also be used to remove material residual particles (e.g., cutting or drilling particles created during the material removal process) from the cutting interface and prevent the residue from clogging the cutting elements.

Typical lubrication media include liquids such as water or oil. While liquids can be generally effective at cooling the components and flushing material residue, their use can create problems. For example, if the cutting operation is being performed in an environment that can be damaged by liquid, it can be difficult to adequately contain the liquid after it exits the cutting interface. It can be particularly difficult to contain the liquid after it has infiltrated the workpiece's structure if the workpiece is porous or includes holes or cavities. It can also be difficult to contain the liquid after the liquid exits the cutting interface. Liquid lubricants can be particularly problematic if the material removal system is being used in a finished interior environment. The amount of liquid needed to adequately lubricate a cutting interface can also present issues in terms of cost, environmental impact, containment, etc.

SUMMARY

Certain embodiments of the present disclosure include systems and methods that utilize foam during material removal.

Exemplary embodiments comprise a system for removing material comprising: a cutting element; an actuator configured to actuate the cutting element; a shaft coupled to the actuator and the cutting element; and a vacuum system configured to remove residual particles created during operation of the system, where the vacuum system comprises a collar that extends around the shaft. In certain embodiments, the residual particles are flushed from the system by a foam.

In specific embodiments, the collar comprises an internal cavity and one or more suction ports in fluid communication with the internal cavity. The plurality of suction ports may comprise radial suction ports and axial suction ports. In certain embodiments, the collar comprises an internal wall surrounding a bore and a plurality of suction ports extending from the internal wall. In specific embodiments, the collar comprises an axial wall and a plurality of suction ports extending from the internal wall.

The vacuum system may comprise a vacuum source and a conduit coupled to the collar. In certain embodiments, the conduit is coupled to the collar at an external port. The collar may comprise a plurality of suction ports in fluid communication with the external port. In certain embodiments, the cutting element comprises a drill bit or a saw blade.

Exemplary embodiments may comprise a method of utilizing foam in a material removal system. The method may comprise: providing an actuator, a cutting element, and a workpiece; actuating the cutting element with the actuator; providing a foam from a foam-generating system; engaging the cutting element with the workpiece at a cutting element interface, and directing the foam to the cutting interface. Exemplary methods may also comprise applying a foam-reducing agent to the foam after the foam has been directed to the cutting interface, where the foam-reducing agent reduces the foam to a liquid; filtering the liquid to remove residual particles and produce a filtered liquid; and directing the filtered liquid to the foam-generating system.

In specific embodiments, the filtered liquid is combined with a foam concentrate in the foam-generating system to produce foam. Certain embodiments may also require removing the foam from the cutting interface with a vacuum system. In specific embodiments, the vacuum system comprises a collar proximal to the cutting interface. In certain embodiments, the collar comprises an internal cavity and one or more suction ports in fluid communication with the internal cavity. The plurality of suction ports may comprise radial suction ports and axial suction ports.

Exemplary embodiments may also comprise: a system for generating foam. Specific embodiments may comprise a pump; a liquid reservoir comprising a liquid, where the pump is configured to pump liquid from the liquid reservoir; a compressor configured to produce compressed air; and a foam concentrate reservoir comprising a foam concentrate. Certain embodiments may also comprise: a first valve configured to control an amount of foam concentrate that is released from the foam concentrate reservoir; a second valve configured to control the amount of liquid pumped from the liquid reservoir; a first pressure sensor configured to stop operation of the compressor when an air pressure downstream of the compressor reaches a high threshold value; and a second pressure sensor configured to start operation of the compressor when the air pressure downstream of the compressor reaches a low threshold value. Specific embodiments may comprise: a first conduit comprising liquid from the liquid reservoir; a second conduit comprising compressed air and the foam concentrate; and a mixer coupling the first conduit and the second conduit, where the foam concentrate and liquid are combined in the mixer to produce a foam.

In particular embodiments, the foam may be directed to a material removal system. In certain embodiments, the foam may be recycled from the material removal system to the foam generating system. Certain embodiments may also comprise a foam-reducing agent configured to reduce the foam to liquid when the foam is being recycled. Specific embodiments may comprise a filter to filter residual particles from the liquid. In certain embodiments, the material removal system comprises a drill. In specific embodiments, the high threshold value is approximately from 5 to about 12 bar, and/or the low threshold value is approximately from about 2 to about 8 bar.

Other advantages and features may become apparent from the following description, drawings, and claims.

DETAILED DESCRIPTION

Embodiments of the present disclosure comprise systems and methods for removing material (e.g., drilling, cutting, or grinding) that utilize foam for lubrication, cooling, and/or evacuation of residual particles.

Figure 1:
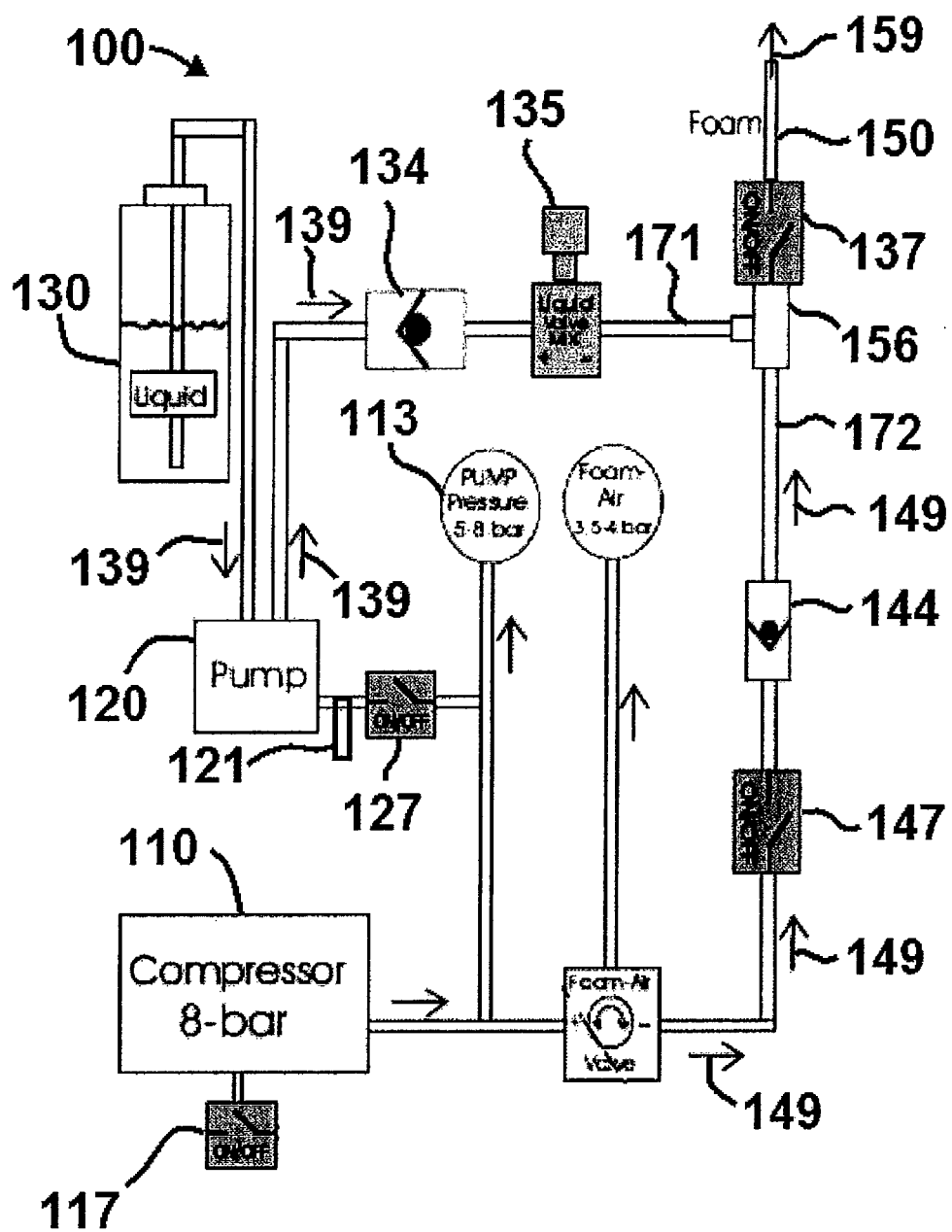
FIG. 1 shows a schematic diagram of a foam producing system according to one or more examples of embodiments of the present invention.

Referring initially to FIG. 1, a schematic diagram of a foam-generating system 100 illustrates a compressor 110, a pump 120, and a liquid reservoir 130, and a foam concentrate reservoir 140. System 100 further comprises a valve 135 configured to control the amount of liquid that is pumped from liquid reservoir 130. The embodiment shown in FIG. 1 also comprises a valve 145 configured to control the amount of foam concentrate that is released from foam concentrate reservoir 140. In other embodiments, foam concentrate may be added directly to liquid reservoir 130, eliminating the need for foam concentrate reservoir 140. In such embodiments, valve 145 can be configured to control the amount of pressurized air that is mixed with a liquid mixture of water and foam concentrate from liquid reservoir 130. In certain exemplary embodiments, the foam concentrate may be configured to reduce or neutralize the electrical conductivity of the liquid mixture or the resulting foam when the liquid mixture is combined with pressurized air.

The embodiment shown in FIG. 1 includes a control switch 117 configured to start and stop compressor 110 as well as a control switch 127 configured to start and stop pump 120. In certain embodiments, a filter 121 is located between compressor 110 and pump 120 or between compressor 110 and control switch 127. In specific embodiments, filter 121 may comprise a built-in moisture separator. In addition, system 100 comprises a control switch 137 to control the flow of foam or liquid from an exit port 150 of system 100. Control switch 137 may be coupled to a solenoid valve or other flow control mechanism (not shown). System 100 further comprises a control switch 147 configured to control the flow of pressured air and foam concentrate.

An exemplary embodiment of one method of operating system 100 to generate foam will now be described. It is understood that other exemplary methods are within the scope of the present invention, and that the disclosed method is provided only for purposes of example. During operation of system 100, an operator can manipulate control switch 117 so that compressor 110 begins operation. In specific embodiments, compressor 110 can have a pressure sensor 113 that provides a signal to a control system (not shown) that controls the pressure produced by compressor 110. In certain embodiments, pressure sensor 113 provides a signal for compressor 110 to cease operation when the pressure downstream of the compressor reaches a pre-determined high threshold level. In specific exemplary embodiments, pressure sensor 113 provides a signal for compressor 110 to cease operation when the pressure reaches a high threshold value of approximately from 6 to about 12 bar. During operation of system 100, pressure sensor 113 can also send a signal to re-start compressor 110 if the pressure downstream of the compressor falls below a low threshold level. In specific embodiments, pressure sensor 113 can send a signal to re-start compressor 110 if the pressure falls below a value of approximately from about 2 to about 8 bar. It is understood that these values are provided as examples, and that other embodiments may have other pressure ranges for the operation of compressor 110.

In this exemplary method of operation, an operator manipulates control switch 117 and allows compressor 110 to operate until the desired pressure is reached and pressure sensor 113 sends a signal for compressor 110 to cease operation. The operator may then manipulate control switch 127 to start pump 120. Pump 120 can then pump liquid from reservoir 130, through a check valve 134 and valve 135 to a mixer 156, which couples conduit 171 (which contains liquid) and conduit 172 (which contains compressed air and foam concentrate).

The operator may then manipulate control switch 137 to allow liquid from reservoir 130 (via pump 120) to exit from exit port 150. Once the flow of liquid from exit port 150 has been established, the operator can then manipulate control switch 147 to allow the foam concentrate and pressurized air to flow to past a check valve 144 and to mixer 156 (which couples the liquid conduit to the foam concentrate conduit). The foam concentrate and liquid can then be mixed in mixer 156, and a foam exits from exit port 150.

The operator can adjust valve 135 to increase or decrease the amount of liquid that is pumped by pump 120 to exit port 150. The operator can also adjust valve 145 to adjust the amount of foam concentrate and pressurized air that is directed to exit port 150. In the schematic diagram of FIG. 1, the flow of liquid is represented by arrows 139, while the flow of foam concentrate and pressurized air is represented by arrow 149. The resulting foam is represented by arrow 159.

Foam concentrates include those known in the art and are generally composed of various surfactants which, when present in small amounts, facilitate the formation of a foam, or enhances its colloidal stability by inhibiting the coalescence of bubbles. Suitable foaming agents include "betaines", such as cocamidopropyl betaines, also referred to as 1-propanaminium, 3-amino-N-(carboxymethyl)-N,N-dimethyl-N-coco acyl derivatives, inner salts, 1-Propanaminium, 3-amino-N-(carboxymethyl)-N,N-dimethyl-, N-coco acyl derivatives, hydroxides, inner salts, or 1-propanaminium, 3-amino-N-(carboxymethyl)-N,N-dimethyl-, N-coco acyl derivatives, inner salts.

Figure 2:
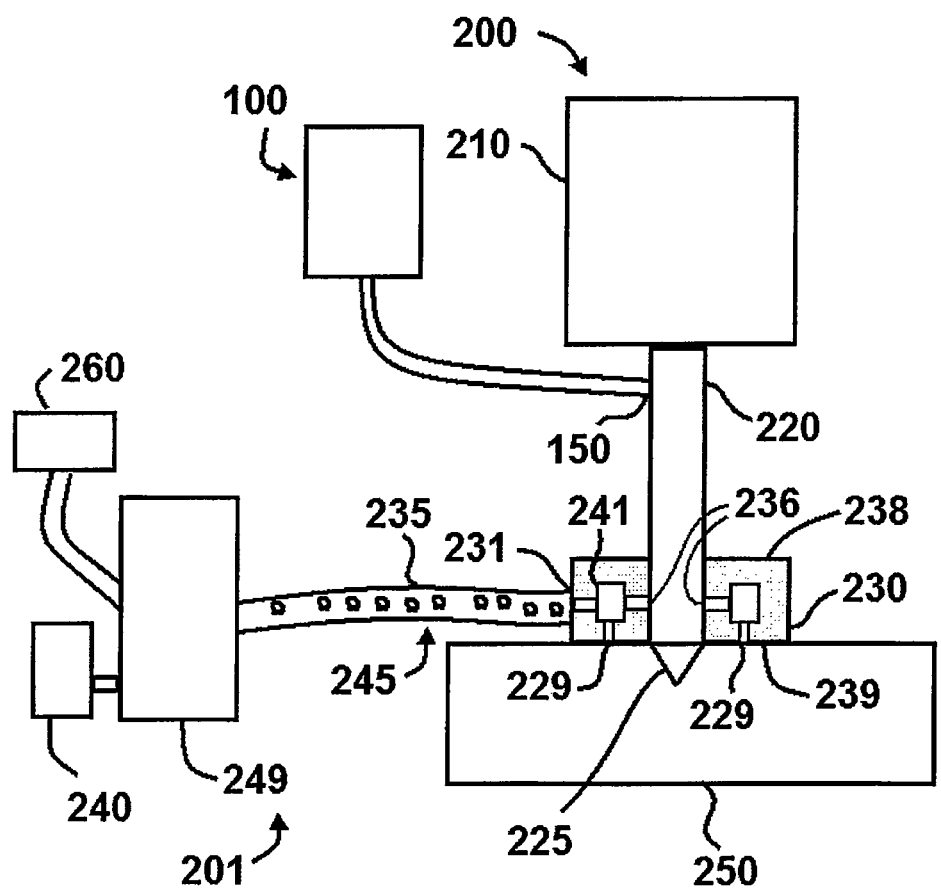
FIG. 2 shows a partial section view of a material removal system incorporating the foam producing system of FIG. 1 and a vacuum system, according to one or more examples of embodiments of the present invention.

Referring now to FIG. 2, a partial section view of an exemplary embodiment of a material removal system 200 is shown. Material removal system 200 utilizes foam from foam-generation system 100 to lubricate components and remove residual material from the cutting interface (e.g., the interface where the cutting element engages the workpiece). It is understood that the material removal system shown in FIG. 2 is merely one example of a material removal system that can utilize foam from foam-generation system 100, and that other exemplary material removal systems may comprise different configurations. The embodiment shown in FIG. 2 comprises a driver or actuator 210 configured to rotate a shaft 220 and a cutting element 225. In the embodiment shown, cutting element 225 is configured as a drill bit, and actuator 210 comprises an electric motor. In other embodiments, actuator 210 may comprise other forms of actuation, including without limitation, an internal combustion engine, hydraulic driven actuator or pneumatically-driven actuator. Other embodiments may also comprise other types of cutting elements, including without limitation, a saw blade. Specific exemplary embodiments may comprise a diamond circular blade or a diamond wire. Exemplary embodiments of material removal system 200 include without limitation, applications for use in wall sawing, or floor sawing. During operation of the embodiment shown in FIG. 2, actuator 210 rotates shaft 220 and cutting element 225. Cutting element 225 engages a workpiece 250 and removes material from workpiece 250.

A material removal system 200 may also be used with a vacuum system 201 configured to remove foam and/or residual materials from the cutting interface. In the embodiment shown, vacuum system 201 comprises a vacuum collar 230 that is coupled to a vacuum source 240 via a conduit 235 and a reservoir 249. A more detailed view of an exemplary embodiment of vacuum collar 230 (shown isolated from material removal system 200) is provided in FIG. 3.

Figure 3:
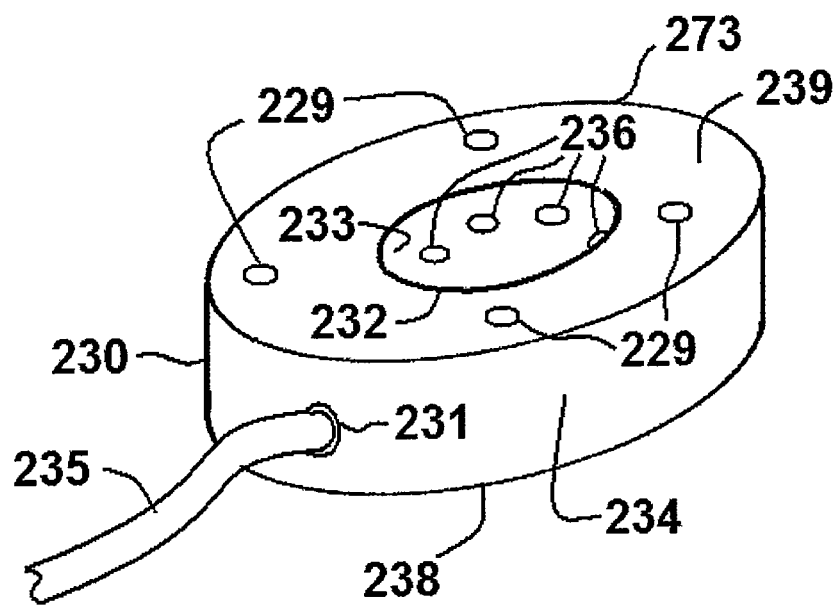
FIG. 3 shows a perspective view of a vacuum collar utilized in a vacuum system, according to one or more examples of embodiments of the present invention.

As shown in FIG. 3, vacuum collar 230 comprises a body 273 with an external wall 234 and an inner wall 233 surrounding a inner bore 232. Vacuum collar 230 also comprises a first axial wall 238 and second axial wall 239. In FIG. 3, vacuum collar 230 is shown inverted, so that second axial wall 239 will normally be facing downward when vacuum collar 230 is being used (as shown in FIG. 2). Conduit 235 is coupled to vacuum collar 230 at an external port 231. As shown in FIGS. 2 and 3, one or more radial suction ports 236 extend from inner wall 233 and are in fluid communication with external port 231 and conduit 235. In the specific embodiment shown, radial suction ports 236 extend to an inner cavity 241 that is in fluid communication with external port 231. In certain embodiments, inner cavity 241 is a ring-shaped cavity that extends around inner bore 232. Radial suction ports 236 may extend radially between inner bore 232 and inner cavity 241 in a manner similar to spokes within a wheel. In other exemplary embodiments, vacuum collar 230 may comprise a single port coupled to conduit 235 and not include a plurality of radial and axial suction ports.

In addition, vacuum collar 230 is configured so that one or more axial suction ports extend from second axial wall 239 and are in fluid communication with inner cavity 241 and external port 231. It is understood that the embodiment shown in FIG. 3 is merely exemplary, and that other vacuum collars within the scope of this disclosure may comprise a different configuration than that shown in FIG. 3. For example, other exemplary embodiments may comprise suction ports in a different configuration from that shown, and may include only radial or axial suction ports.

During operation, residual particles 245 are flushed from the interface of cutting element 225 and workpiece 250 by foam exiting from exit port 150 of foam generation system 100. The foam, along with residual particles 245, can then be collected by vacuum system 201. As used herein, the term "residual particles" is used to describe waste or scrap particles generated during the material removal process (e.g., material shavings, dust, cutting slurries, etc.)

In the embodiment shown in FIG. 2, foam from system 100 is directed through shaft 220 to the interface of cutting element 225 and work piece. In other embodiments, the foam may be initially directed to a different location from that shown in FIG. 2. Radial suction ports 236 and axial suction ports 229 are proximal to the cutting interface and serve as the initial entry point for the foam (and/or residual particles 245) to enter vacuum system 201. Collar 230 is shown in a section view in FIG. 2, so that the internal features of the collar are visible. The foam and residual particles 245 can be directed to inner cavity 241 of collar 230 and to external port 231. The foam and residual particles 245 may then flow through conduit 235 to reservoir 249 for collection.

Once the foam has been collected in reservoir 249, it can either be disposed of or recycled. In the embodiment shown in FIG. 2, a foam reducing agent 260 can be injected into reservoir 249 to reduce the foam back to a liquid and allow for the liquid to be disposed.

Figure 4:
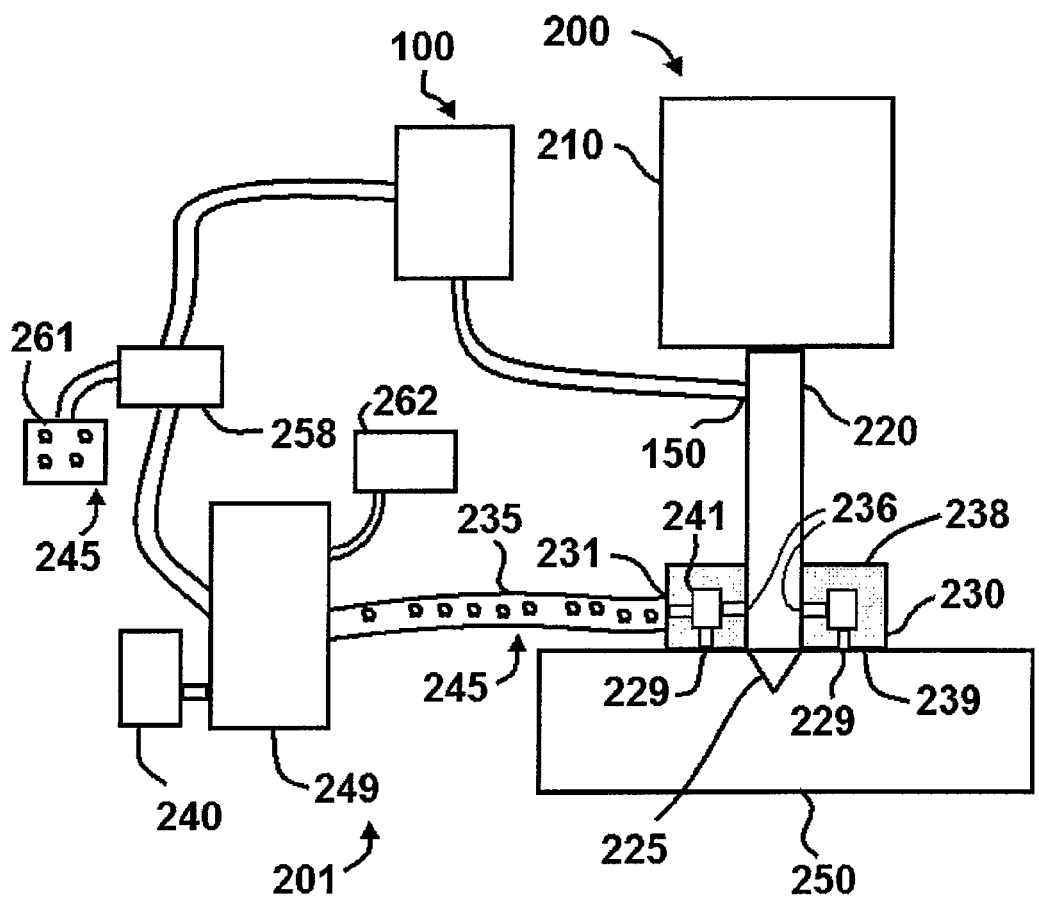
FIG. 4 shows a partial section view of a material removal system incorporating the foam producing system of FIG. 1 and a liquid recycle system, according to one or more examples of embodiments of the present invention.
Figure 5:
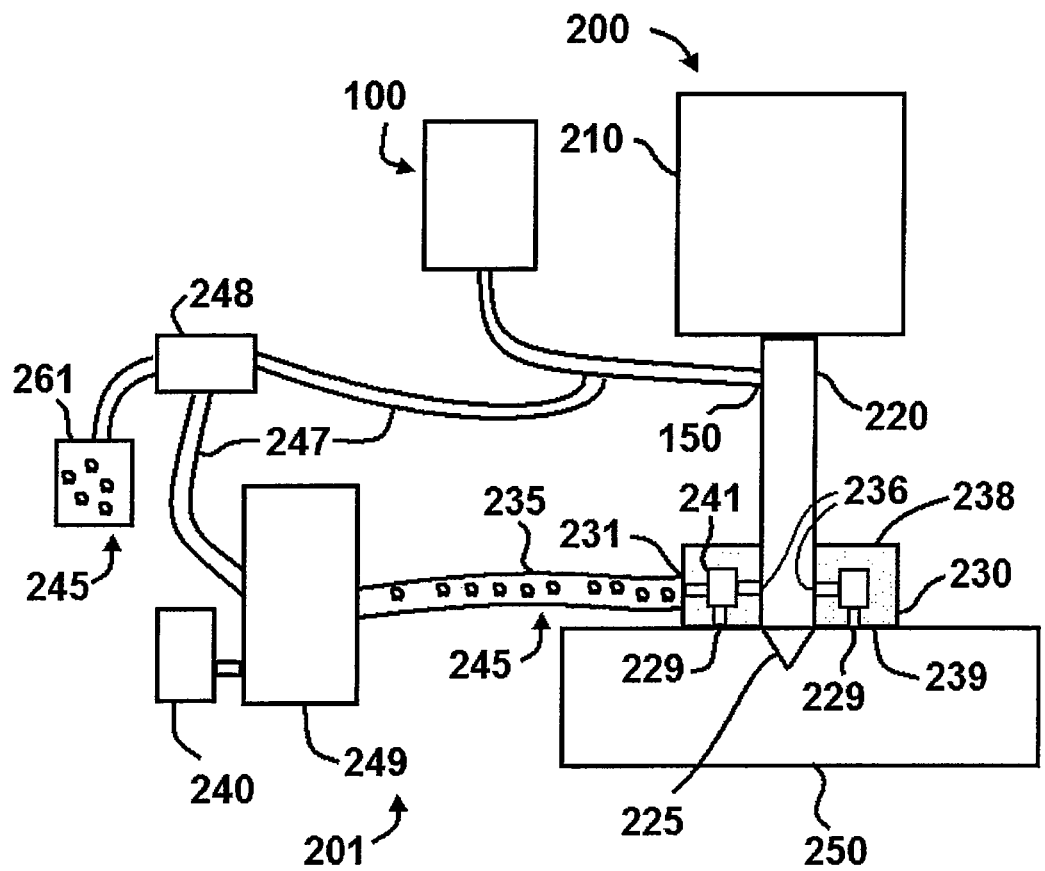
FIG. 5 shows a partial section view of a material removal system incorporating the foam producing system of FIG. 1 and a foam recycle system, according to one or more examples of embodiments of the present invention.

In other embodiments, the foam with residual particles 245 can be reduced to a liquid that is filtered and re-used in foam-generation system 100. Referring now to FIG. 4, a foam reducing agent 262 is added to reservoir 249 to reduce the foam to a liquid. The liquid can then be filtered by filter 258 so that residual particles 245 are removed from the liquid and sent to disposal container 261. The filtered liquid can then be sent back to system 100 (e.g., to liquid reservoir 130) to be re-used in the foam-generation system 100. This can reduce the amount of liquid consumed by foam-generation system 100 and reduce costs. The embodiment shown and described in FIG. 4 also creates a closed-loop system that minimizes the impact of the foam on the environment. It is understood that the arrangement of the components shown in FIG. 5 is just one of many exemplary embodiments. For example, in other embodiments, the foam may be filtered to remove residual particles 245 prior to the addition of a foam reducing agent.

Foam reducing agents are known in the art and include silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, aqueous salt solutions, alkyl phosphate esters such as monostearyl phosphate, and the like as well as acetylenic diols, such as FOAM BLAST™, or aliphatic polyoxyethylene ethers, made from fatty alcohol ethoxylatse with epichlorohydrin and formed in a polymeric star configuration, commercially available, under the trade name DEHYDRAN™. A discussion of suitable agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Referring now to FIG. 5, in this embodiment the foam is recycled rather than disposed. The foam can be filtered via filter 248 to remove residual particles 245 from the foam. Residual particles 245 that are filtered from the foam can be sent to a disposal container 261. The filtered foam can be recycled back (through recycle conduit 247) to exit port 150. At that point, the filtered foam can be combined with the foam generated from system 100. This can reduce the total amount of foam that is required to be generated by system 100 and reduce both the cost of operation and the amount of waste generated. As described herein, this recycling of the foam creates a closed-loop system for the foam utilization. The closed-loop system can reduce the likelihood that foam will impact the surrounding environment. This can be particularly important when material removal system 200 is being used in environments where it is desirable to minimize or eliminate the exposure to foam (e.g., a finished interior environment). In such environments, objects such as furniture, drywall, flooring, etc. can be negatively impacted by liquid. The use of foam, instead of liquid, minimizes the potential negative impacts by improving the confinement in a limited area of the foam. Exemplary embodiments may be utilized with the foam system described herein with or without the vacuum systems shown and described in this disclosure.

Figure 6:
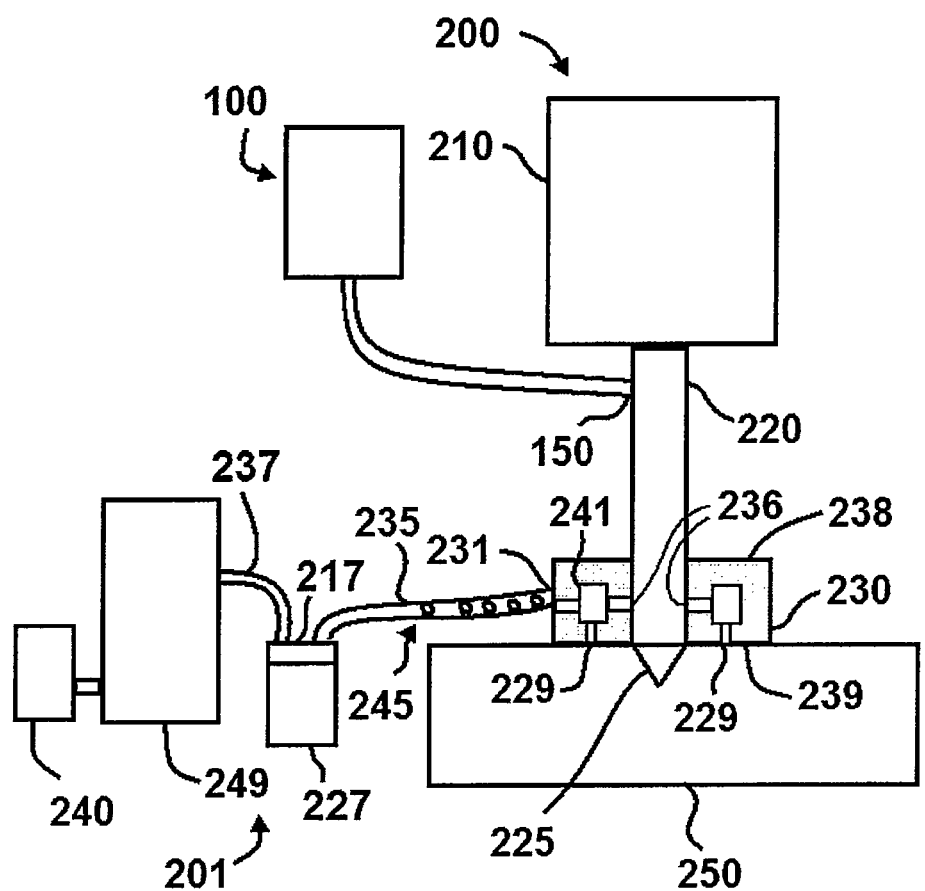
FIGS. 6-11 show an exemplary embodiment of the present invention.
Figure 7:
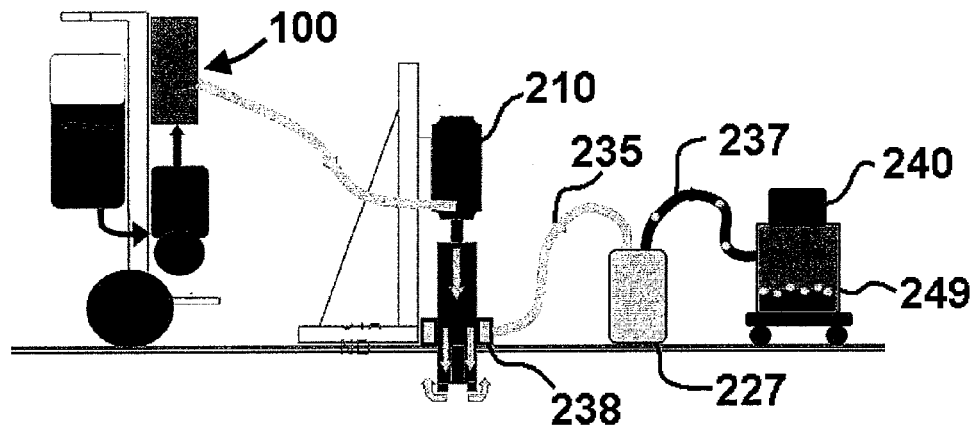
Figure 8:
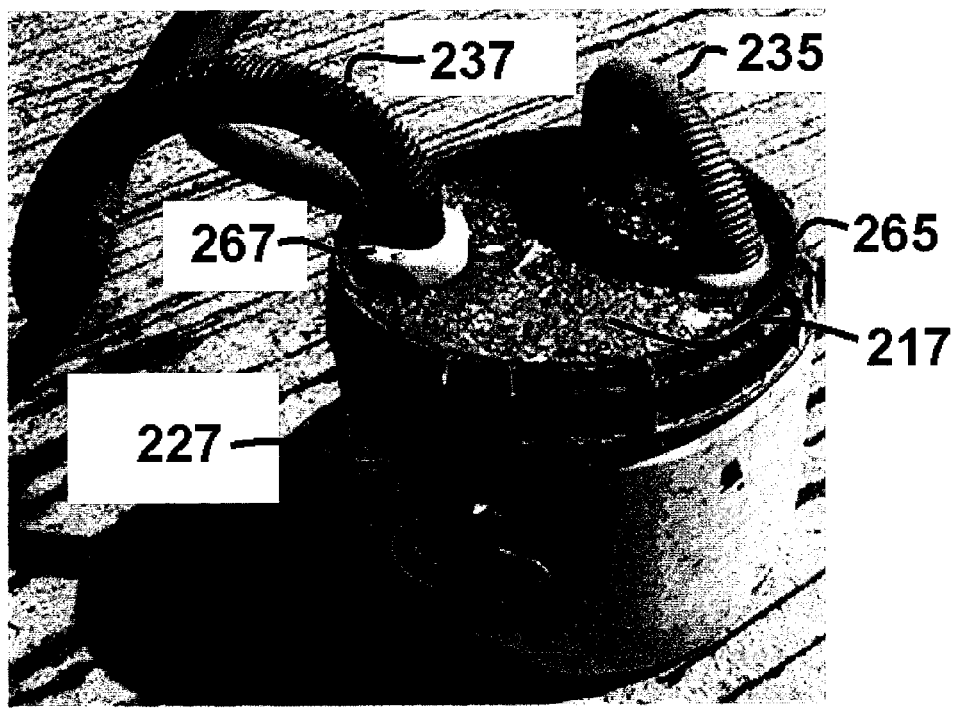
Figure 9:
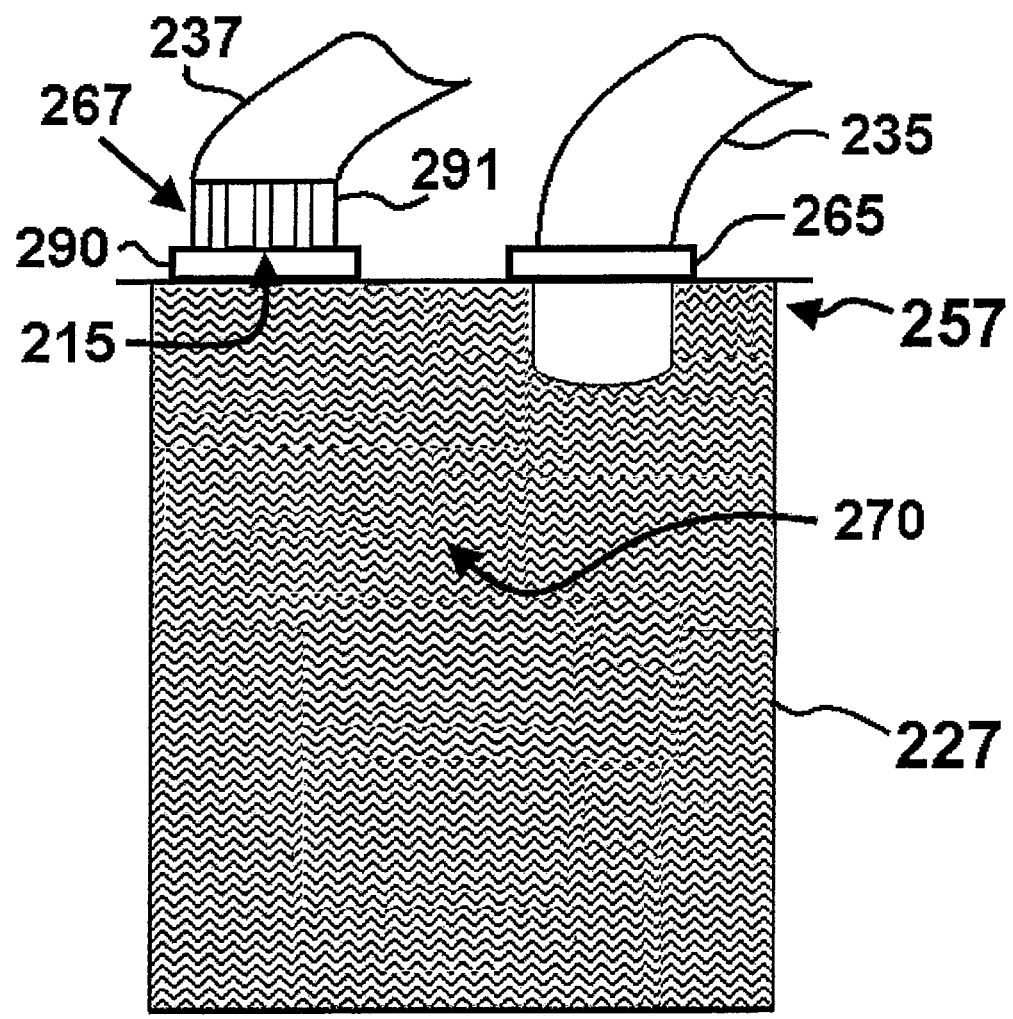
Figure 10:
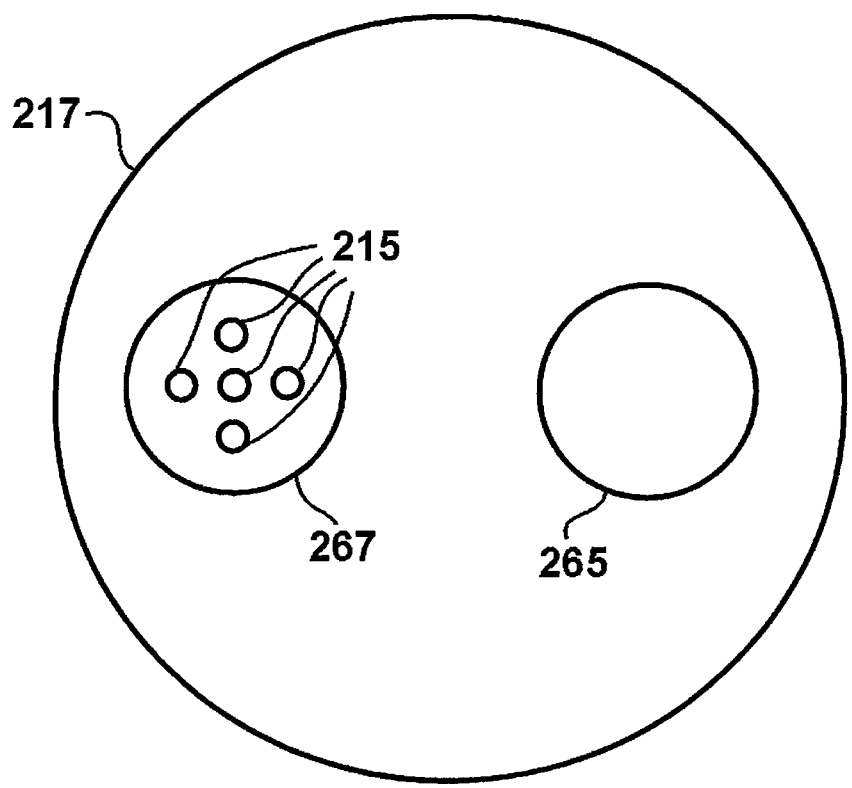
Figure 11:
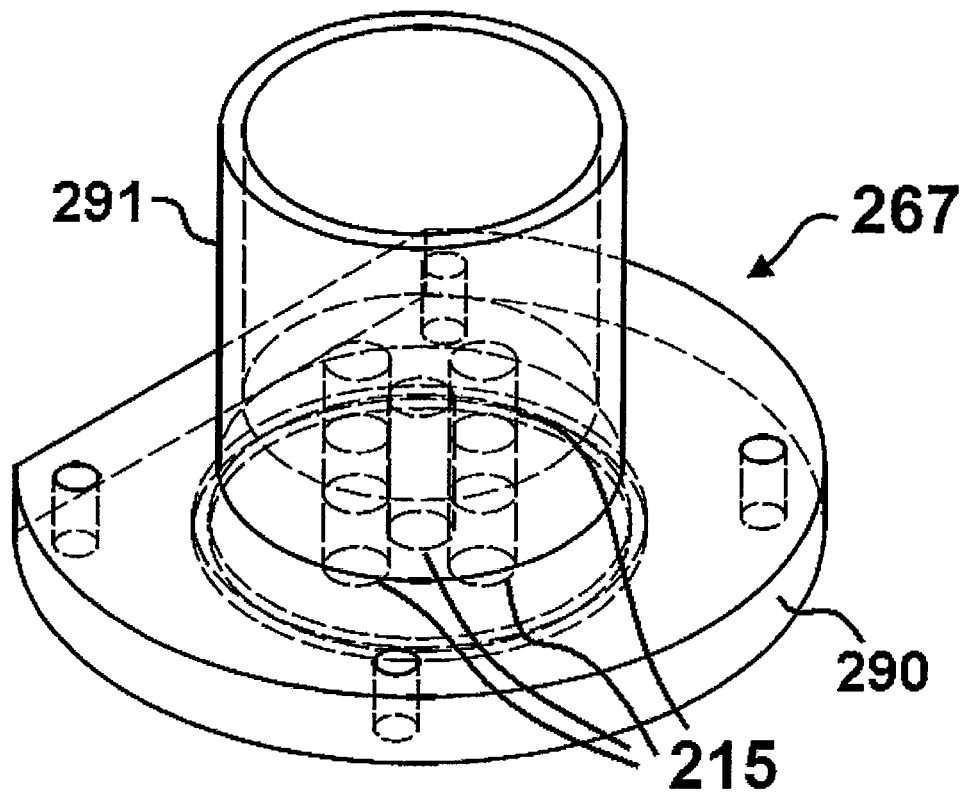

Referring now to FIGS. 6-11, an exemplary embodiment is similar to the embodiment disclosed in FIG. 2. However, rather than a foam reducing agent, this exemplary embodiment comprises a foam-reduction or foam-to-liquid transforming device 227 in fluid communication with vacuum collar 230 via a conduit 235. Foam-to-liquid transforming device 227 is also in fluid communication with reservoir 249 via a conduit 237. In the specific embodiment shown, foam-to-liquid transforming device 227 comprises a removable cover portion 217 that is coupled to conduits 235 and 237. FIGS. 6 and 7 provide schematic overviews of the system, while FIG. 8 provides a perspective view of foam-to-liquid transforming device 227. FIG. 9 provides a schematic cross-section of foam-to-liquid transforming device 227 during operation, and FIG. 10 shows a detailed view of the interior of cover portion 217. FIG. 11 provides a perspective view of a coupling member 267, which is configured to couple conduit 237 to cover portion 217.

During operation, vacuum source 240 can draw foam 270 (and residual particles 245) from collar 230 through conduit 235 to foam-to-liquid transforming device 227. In the embodiment shown, conduits 235 and 237 are coupled to cover portion 217 of foam-to-liquid transforming device 227 via coupling members 265 and 267, respectively. As shown in FIG. 9, foam 270 enters an upper portion 257 of foam-to-liquid transforming device 227 via conduit 235 and accumulates in foam-to-liquid transforming device 227 until foam 270 reaches coupling member 267 and conduits 215.

As vacuum source 240 draws foam 270 through coupling member 267, foam 270 is directed through a plurality of conduits 215 that each have a diameter that is smaller than the diameter of conduit 235 and 237. In exemplary embodiments, the sum of the cross-sectional areas of conduits 215 is less than the cross sectional area of conduit 237.

Referring specifically to FIG. 11, in this exemplary embodiment coupling member 267 comprises a flange portion 290, an extension 291, and conduits 215. Flange portion 290 provides a mounting surface that allows coupling member 267 to be coupled to cover portion 217, and extension 291 allows coupling member 267 to be coupled to conduit 237. Conduits 215 extend through flange portion 290 (while extension 291 does not) so that fluids or foam 270 that pass through coupling member 267 are forced to pass through conduits 215.

As foam 270 is drawn through conduits 215, the diameter of each conduit is sized sufficiently small enough to cause a portion of the foam to convert to liquid. During operation the bubbles in foam 270 are forced against each other (and against the walls of each conduit 215) so that the pressure exerted on bubbles in foam 270 is increased. When the pressure is increased sufficiently, the bubbles collapse and the volume of foam 270 is reduced as it becomes a foam and liquid mixture. This reduction in volume of foam 270 allows for material removal system 200 to be operated for longer periods of time (as compared to material removal systems that do not reduce the volume of foam 270). If the volume of foam 270 is not reduced, the capacity of reservoir 249 can be a limiting factor on the maximum operating time of material removal system 200. When reservoir 249 is filled with foam, the operation of material removal system 200 should be stopped in order to remove the foam and/or liquid from reservoir 249. By reducing the volume of foam 270 prior to it entering reservoir 249, the maximum operation time of material removal system 200 can be extended.

In specific embodiments, the diameter of one or more conduits in the plurality of conduits 215 may be between 4 and 8 millimeters, or more specifically between 5 and 7 millimeters. In a specific embodiment, the diameter of one or more conduits in the plurality of conduits 215 is approximately 6 millimeters. In certain specific embodiments, the length of one or more conduits in the plurality of conduits 215 may be between 50 and 500 millimeters, or between 60 and 400 millimeters, or between 70 and 300 millimeters, or between 80 and 200 millimeters, or between 90 and 100 millimeters. In a specific embodiment the length of one or more conduits in the plurality of conduits 215 is approximately 100 millimeters.

Once the liquid and foam mixture has been collected in reservoir 249, it can either be disposed of or filtered and recycled for use. In specific embodiments, the liquid that results from the collapsed foam can be converted back to foam via foam generating system 100 prior to re-use.

Figure 12:
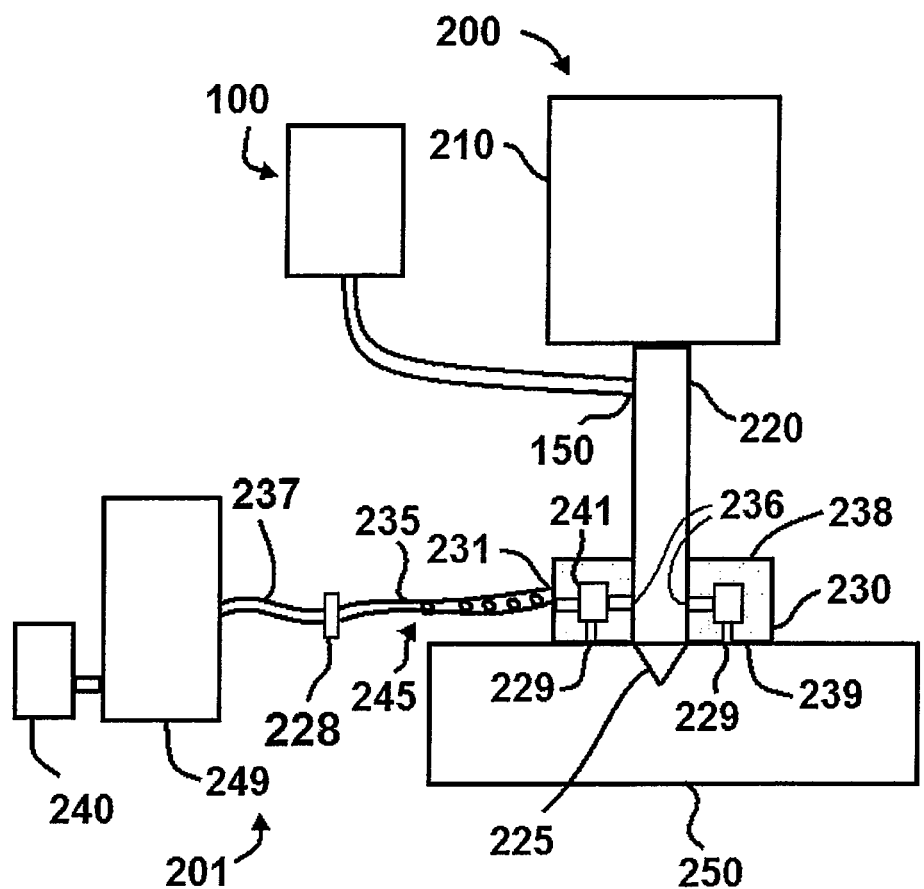
FIGS. 12 and 13 show certain embodiments of the present invention.
Figure 13:
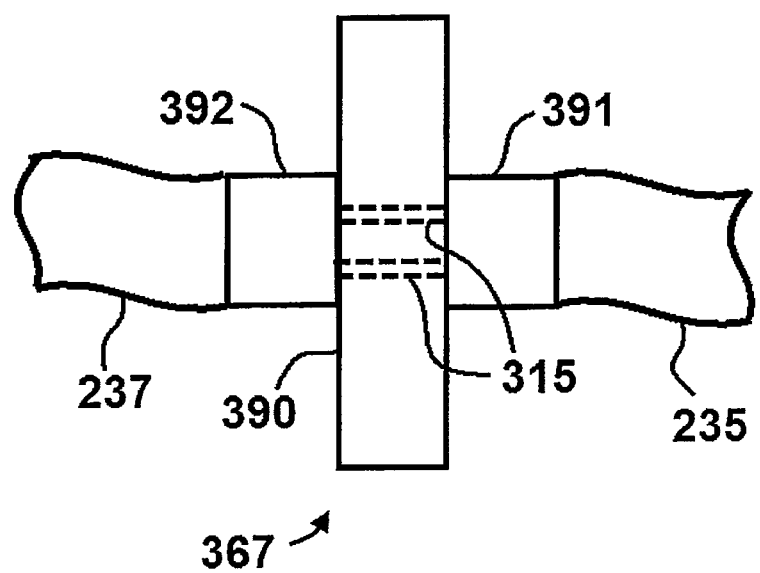

Referring now to FIGS. 12 and 13, in certain embodiments, a foam-to-liquid transforming device 328 may not comprise a reservoir that is external to conduits 235 and 237. FIG. 12 provides an overview of material removal system 200 utilizing foam-to-liquid transforming device 328, while FIG. 13 provides a more detailed view of foam-to-liquid transforming device 328 coupled to 235 and 237.

Foam-to-liquid transforming device 328 may be configured generally similar to coupling member 267, e.g., foam-to-liquid transforming device 328 comprises a flange portion 390, an extension 391, and a plurality of conduits 315. However, foam-to-liquid transforming device 328 may also comprise an additional extension portion 392 so that it may be coupled to both conduits 235 and 237. When foam-to-liquid transforming device 328 is coupled to conduits 235 and 237, conduits 315 are placed in fluid communication with conduits 235 and 237. In specific embodiments, conduits 315 are placed in line with (e.g., collinear with) conduits 235 and 237 such that the outer circumference of conduit 235 and 237 circumscribe conduits 315. During operation, conduits 315 act upon the foam bubbles passing through them in the same general manner described above with respect to conduits 215, and transform the foam to liquid.

Although various representative embodiments of this invention have been described above with a certain degree of particularity, those skilled in the art could make numerous alterations to the disclosed embodiments without departing from the spirit or scope of the inventive subject matter set forth in the specification and claims. For example, the material removal system illustrated and described herein is configured with a shaft and rotating cutting element. In addition, other embodiments may use a centrifuge, cyclone separator or press to separate the residual particles from the foam or liquid to be used in recycling. However, other material removal systems that utilize the foam generating/recycling system described herein may utilize other types of cutting element. Other embodiments may have components with different configurations than those shown in the attached figures.

Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The following paragraphs enumerated consecutively from 1 through eighty (80) provide for various aspects of the present invention. In one embodiment, in a first paragraph (1), the present invention provides a system for removing material, the system comprising:
 a cutting element;
 an actuator configured to actuate the cutting element;
 a shaft coupled to the actuator and the cutting element; and
 a foam generation system configured to direct foam to the cutting element.

2. The system of paragraph 1 wherein the residual particles are flushed from the system by a foam.

3. The system of paragraph 1 further comprising a vacuum system configured to remove residual particles created during operation of the system, wherein the vacuum system comprises a collar that extends around the shaft.

4. The system of paragraph 3 wherein the collar comprises an internal cavity and one or more suction ports in fluid communication with the internal cavity.

5. The system of paragraph 4 wherein the plurality of suction ports comprises radial suction ports and axial suction ports.

6. The system of paragraph 3 wherein the collar comprises an internal wall surrounding a bore and a plurality of suction ports extending from the internal wall.

7. The system of paragraph 3 wherein the collar comprises an axial wall and a plurality of suction ports extending from the internal wall.

8. The system of paragraph 3 wherein the vacuum system comprises a vacuum source and a conduit coupled to the collar.

9. The system of paragraph 8 wherein the conduit is coupled to the collar at an external port.

10. The system of paragraph 9 wherein the collar comprises a plurality of suction ports in fluid communication with the external port.

11. The system of paragraph 1 wherein the cutting element comprises a drill bit.

12. The system of paragraph 1 wherein the cutting element comprises a saw blade.

13. A method of utilizing foam in a material removal system, the method comprising:
 providing an actuator, a cutting element, and a workpiece;
 actuating the cutting element with the actuator;
 providing a foam from a foam-generating system;
 engaging the cutting element with the workpiece at a cutting element interface;
 directing the foam to the cutting interface;
 applying a foam-reducing agent to the foam after the foam has been directed to the cutting interface, wherein the foam-reducing agent reduces the foam to a liquid;
 filtering the liquid to remove residual particles and produce a filtered liquid; and
 directing the filtered liquid to the foam-generating system.

14. The method of paragraph 13 wherein the filtered liquid is combined with a foam concentrate in the foam-generating system to produce foam.

15. The method of paragraph 13 further comprising removing the foam from the cutting interface with a vacuum system.

16. The method of paragraph 15 wherein the vacuum system comprises a collar proximal to the cutting interface.

17. The method of paragraph 16 wherein the collar comprises an internal cavity and one or more suction ports in fluid communication with the internal cavity.

18. The method of paragraph 17 wherein the plurality of suction ports comprises radial suction ports and axial suction ports.

19. The method of paragraph 16 wherein the collar comprises an internal wall surrounding a bore and a plurality of suction ports extending from the internal wall.

20. The method of paragraph 16 wherein the collar comprises an axial wall and a plurality of suction ports extending from the internal wall.

21. The method of paragraph 16 wherein the vacuum system comprises a vacuum source and a conduit coupled to the collar.

22. The method of paragraph 21 wherein the conduit is coupled to the collar at an external port.

23. The system of paragraph 22 wherein the collar comprises a plurality of suction ports in fluid communication with the external port.

24. A system for generating foam, the system comprising:
 a pump;
 a liquid reservoir comprising a liquid, wherein the pump is configured to pump liquid from the liquid reservoir;
 a compressor configured to produce compressed air;
 a foam concentrate reservoir comprising a foam concentrate;
 a first valve configured to control an amount of foam concentrate that is released from the foam concentrate reservoir;
 a second valve configured to control the amount of liquid pumped from the liquid reservoir;
 a first pressure sensor configured to stop operation of the compressor when an air pressure downstream of the compressor reaches a high threshold value;
 a second pressure sensor configured to start operation of the compressor when the air pressure downstream of the compressor reaches a low threshold value;
 a first conduit comprising liquid from the liquid reservoir;
 a second conduit comprising compressed air and the foam concentrate; and
 a mixer coupling the first conduit and the second conduit, wherein the foam concentrate and liquid are combined in the mixer to produce a foam.

25. The system of paragraph 24, wherein the foam is directed to a material removal system.

26. The system of paragraph 25, wherein the foam is recycled from the material removal system to the foam generating system.

27. The system of paragraph 26, further comprising a foam-reducing agent configured to reduce the foam to liquid when the foam is being recycled.

28. The system of paragraph of paragraph 25, further comprising a filter to filter residual particles from the liquid.

29. The system of paragraph 23, wherein the material removal system comprises a drill.

30. The system of paragraph 24 wherein the high threshold value is approximately from about 6 to about 12 bar.

31. The system of paragraph 24 wherein the low threshold value is approximately from about 2 to about 8 bar.

32. The system of paragraph 24, wherein a premixed foam concentrate and liquid is placed in a liquid reservoir.

33. A foam-to-liquid transforming device comprising:
a coupling member comprising a plurality of coupling member conduits, wherein:
the coupling member is configured to couple a first vacuum conduit and a second vacuum conduit;
the plurality of coupling member conduits each have a diameter smaller than the diameter of the first vacuum conduit and smaller than the diameter of the second vacuum conduit; and
the plurality of coupling member conduits are in fluid communication with the first vacuum conduit and with the vacuum second conduit.

34. The foam-to-liquid transforming device of paragraph 33, wherein the plurality of coupling member conduits are collinear with the first and second vacuum conduits when the foam-to-liquid transforming device is coupled to the first and second vacuum conduits.

35. A foam-to-liquid transforming device comprising:
a reservoir;
a first conduit in fluid communication with the reservoir;
a second conduit in fluid communication with the reservoir;
a plurality of conduits in fluid communication with the second conduit, wherein each conduit in the plurality of conduits has a diameter that is less than the diameter of the second conduit.

36. The foam-to-liquid transforming device of paragraph 35 wherein the diameter of one or more conduit in the plurality of conduits is between approximately 4 millimeters and 8 millimeters.

37. The foam-to-liquid transforming device of paragraph 35 wherein the diameter of one or more conduit in the plurality of conduits is between approximately 5 millimeters and 7 millimeters.

38. The foam-to-liquid transforming device of paragraph 35 wherein the diameter of one or more conduit in the plurality of conduits is approximately 6 millimeters.

39. The foam-to-liquid transforming device of paragraph 35 wherein the plurality of conduits comprises between 2 and 10 conduits.

40. The foam-to-liquid transforming device of paragraph 35 wherein the plurality of conduits comprises between 3 and 9 conduits.

41. The foam-to-liquid transforming device of paragraph 35 wherein the plurality of conduits comprises between 4 and 8 conduits.

42. The foam-to-liquid transforming device of paragraph 35 wherein the plurality of conduits comprises between 5 and 7 conduits.

43. The foam-to-liquid transforming device of paragraph 35 wherein the length of one or more conduit in the plurality of conduits is between approximately 50 millimeters and 500 millimeters.

44. The foam-to-liquid transforming device of paragraph 35 wherein the length of one or more conduit in the plurality of conduits is between approximately 60 millimeters and 400 millimeters.

45. The foam-to-liquid transforming device of paragraph 35 wherein the length of one or more conduit in the plurality of conduits is between approximately 70 millimeters and 300 millimeters.

46. The foam-to-liquid transforming device of paragraph 35 wherein the length of one or more conduit in the plurality of conduits is between approximately 80 millimeters and 200 millimeters.

47. The foam-to-liquid transforming device of paragraph 35 wherein the length of one or more conduit in the plurality of conduits is between approximately 90 millimeters and 100 millimeters.

48. The foam-to-liquid transforming device of paragraph 35 wherein the length of one or more conduit in the plurality of conduits is approximately 100 millimeters.

49. The foam-to-liquid transforming device of paragraph 35 wherein a first conduit in the plurality of conduits is adjacent to a second conduit in the plurality of conduits.

50. The foam-to-liquid transforming device of paragraph 35 wherein the plurality of conduits are located within a coupling member configured to couple the second conduit to reservoir.

51. The foam-to-liquid transforming device of paragraph 35 wherein the plurality of conduits are located within the second conduit.

52. The foam-to-liquid transforming device of paragraph 35 wherein the foam-to-liquid transforming device comprises a removable cover portion, and wherein the plurality of conduits are coupled to the removable cover portion.

53. The foam-to-liquid transforming device of paragraph 35 wherein the plurality of conduits are coupled to an upper portion of the reservoir.

54. A system for removing material, the system comprising:
a cutting element;
an actuator configured to actuate the cutting element;
a shaft coupled to the actuator and the cutting element;
a vacuum system configured to remove residual particles created during operation of the system, wherein the vacuum system comprises:
a vacuum source;
a first reservoir; and
a collar that extends around the shaft;
a foam generation system configured to generate foam and direct the foam proximal to the collar; and
a foam-to-liquid transforming device configured to reduce the foam, wherein the foam-to-liquid transforming device comprises a plurality of conduits configured to convert the foam to liquid as the foam passes through the plurality of conduits.

55. The system of paragraph 54 wherein the foam-to-liquid transforming device is coupled to a first conduit in fluid communication with the collar and wherein the foam-to-liquid transforming device is coupled to a second conduit in fluid communication with the first reservoir.

56. The system of paragraph 54 wherein the plurality of conduits are in fluid communication with the second conduit, wherein each conduit in the plurality of conduits has a diameter that is less than the diameter of the second conduit.

57. A method of reducing a volume of foam, the method comprising:
providing a first reservoir, a vacuum source, a first conduit, and a second conduit, and a plurality of conduits wherein:
the first conduit is in fluid communication with the first reservoir;
the second conduit is in fluid communication with the vacuum source and the first reservoir; and
the sum of the cross-sectional area of the plurality of conduits is less than the cross-sectional area of the second conduit;
operating the vacuum source to create a vacuum on the first reservoir, the first conduit and the second conduit; and drawing foam through the first conduit, into the first reservoir, through the plurality of conduits and into the second conduit.

58. The method of paragraph 57 wherein the volume of foam is reduced as the foam is drawn through the plurality of conduits.

59. The method of paragraph 57 wherein a portion of the foam is converted to a liquid as the foam is drawn through the plurality of conduits.

60. The method of paragraph 59 wherein the second conduit is in fluid communication with a second reservoir and wherein the liquid is collected in the second reservoir.

61. A system for removing material, the system comprising:
a cutting element;
an actuator configured to actuate the cutting element;
a shaft coupled to the actuator and the cutting element;
a vacuum system configured to remove residual particles created during operation of the system, wherein the vacuum system comprises:
a vacuum source;
a first reservoir; and
a collar that extends around the shaft;
a foam generation system configured to generate foam and direct the foam proximal to the collar; and
a foam-to-liquid transforming device configured to reduce the foam, wherein the foam-to-liquid transforming device comprises a plurality of conduits configured to convert the foam to liquid as the foam passes through the plurality of conduits.

62. The system of paragraph 61, wherein the foam-to-liquid transforming device is coupled to a first conduit in fluid communication with the collar and wherein the foam-to-liquid transforming device is coupled to a second conduit in fluid communication with the first reservoir.

63. The system of either of paragraphs 61 or 62, wherein the plurality of conduits are in fluid communication with the second conduit, wherein each conduit in the plurality of conduits has a diameter that is less than the diameter of the second conduit.

64. The system of any of paragraphs 61 through 63, wherein the diameter of one or more conduit in the plurality of conduits is between approximately 4 millimeters 65. The system of any of paragraphs 61 through 64, wherein the plurality of conduits comprises between 2 and 10 conduits.

66. The system of any of paragraphs 61 through 65, wherein the length of one or more conduit in the plurality of conduits is between approximately 50 millimeters and 500 millimeters.

67. The system of any of paragraphs 61 through 66, wherein a first conduit in the plurality of conduits is adjacent to a second conduit in the plurality of conduits.

68. The system of any of paragraphs 61 through 67, wherein the plurality of conduits are located within a coupling member configured to couple the second conduit to reservoir.

69. The system of any of paragraphs 61 through 67, wherein the plurality of conduits are located within the second conduit.

70. The system of any of paragraphs 61 through 69, wherein the foam-to-liquid transforming device comprises a removable cover portion, and wherein the plurality of conduits are coupled to the removable cover portion.

71. The system of any of paragraphs 61 through 69, wherein the plurality of conduits are coupled to an upper portion of the reservoir.

72. A method of reducing a volume of foam, the method comprising:
providing a first reservoir, a vacuum source, a first conduit, and a second conduit, and a plurality of conduits wherein:
the first conduit is in fluid communication with the first reservoir;
the second conduit is in fluid communication with the vacuum source and the first reservoir; and
the sum of the cross-sectional area of the plurality of conduits is less than the cross-sectional area of the second conduit;
operating the vacuum source to create a vacuum on the first reservoir, the first conduit and the second conduit; and
drawing foam through the first conduit, into the first reservoir, through the plurality of conduits and into the second conduit.

73. The method of paragraph 72, wherein the volume of foam is reduced as the foam is drawn through the plurality of conduits.

74. The method of paragraph 72, wherein a portion of the foam is converted to a liquid as the foam is drawn through the plurality of conduits.

75. The method of paragraph 72, wherein the second conduit is in fluid communication with a second reservoir and wherein the liquid is collected in the second reservoir.

76. The method of any of paragraphs 72 through 75, wherein the diameter of one or more conduit in the plurality of conduits is between approximately 4 millimeters 77. The method of any of paragraphs 72 through 76, wherein a first conduit in the plurality of conduits is adjacent to a second conduit in the plurality of conduits.

78. The method of any of paragraphs 72 through 77, wherein the plurality of conduits are located within a coupling member configured to couple the second conduit to reservoir.

79. The method of any of paragraphs 72 through 77, wherein the foam-to-liquid transforming device comprises a removable cover portion, and wherein the plurality of conduits are coupled to the removable cover portion.

80. The method of any of paragraphs 72 through 77, wherein the plurality of conduits are coupled to an upper portion of the reservoir.

Although the present invention has been described with reference to preferred embodiments, persons skilled in the art will recognize that changes may be made in form and detail without departing from the spirit and scope of the invention.

REFERENCES

The following references are incorporated by reference herein:
U.S. Pat. No. 3,589,468
U.S. Pat. No. 5,128,178
U.S. Pat. No. 6,673,572
U.S. Patent Pub. 2002/0115390
U.S. Pat. No. 6,792,375
U.S. Patent Pub. 2003/0167728
U.S. Pat. No. 6,790,245
U.S. Pat. No. 6,890,131
U.S. Pat. No. 6,026,618
U.S. Pat. No. 6,071,047
U.S. Pat. No. 6,588,516
U.S. Pat. No. 6,609,668
U.S. Pat. No. 2,578,040
U.S. Pat. No. 3,518,917
U.S. Pat. No. 4,325,663
U.S. Pat. No. 4,662,802

U.S. Pat. No. 5,660,240
U.S. Pat. No. 5,800,104

What is claimed is:

1. A system for removing material, the system comprising:
a cutting element;
an actuator configured to actuate the cutting element;
a shaft coupled to the actuator and the cutting element;
a foam generation system configured to generate foam and direct the foam through the shaft towards a cutting interface between the cutting element and a workpiece;
a vacuum system comprising:
   a collar extending around the shaft and enclosing the cutting interface,
   a plurality of radial suction ports in the collar and proximal to the cutting interface;
   a plurality of axial suction ports in the collar and proximal to the cutting interface; and
   a vacuum source connected to the plurality of radial suction ports and the plurality of axial suction ports, wherein the foam generation system and the vacuum system are configured to create a stream of foam flowing through the shaft and proximal to the cutting element to flush particles created during operation of the system from the cutting interface out of the collar through the plurality of radial and axial suction ports; and
a foam-to-liquid transforming device configured to reduce the foam, wherein the foam-to-liquid transforming device comprises a plurality of conduits configured to convert the foam to liquid as the foam passes through the plurality of conduits.

2. The system of claim 1, wherein the foam-to-liquid transforming device is coupled to a first conduit in fluid communication with the collar and wherein the foam-to-liquid transforming device is coupled to a second conduit in fluid communication with the first reservoir.

3. The system of claim 1, wherein the plurality of conduits are in fluid communication with a second conduit, wherein each conduit in the plurality of conduits has a diameter that is less than a diameter of the second conduit.

4. The system of claim 1, wherein a diameter of one or more conduit in the plurality of conduits is between 4 millimeters and 8 millimeters.

5. The system of claim 1, wherein the plurality of conduits comprises between 2 and 10 conduits.

6. The system of claim 1, wherein a length of one or more conduit in the plurality of conduits is between 50 millimeters and 500 millimeters.

7. The system of claim 1, wherein a first conduit in the plurality of conduits is adjacent to a second conduit in the plurality of conduits.

8. The system of claim 1, wherein the plurality of conduits are located within a coupling member configured to couple a second conduit to reservoir.

9. The system of claim 1, wherein the plurality of conduits are located within a second conduit.

10. The system of claim 1, wherein the foam-to-liquid transforming device comprises a removable cover portion, and wherein the plurality of conduits are coupled to the removable cover portion.

11. The system of claim 1, wherein the plurality of conduits are coupled to an upper portion of a reservoir.

\* \* \* \* \*